United States Patent Office 2,969,319
Patented Jan. 24, 1961

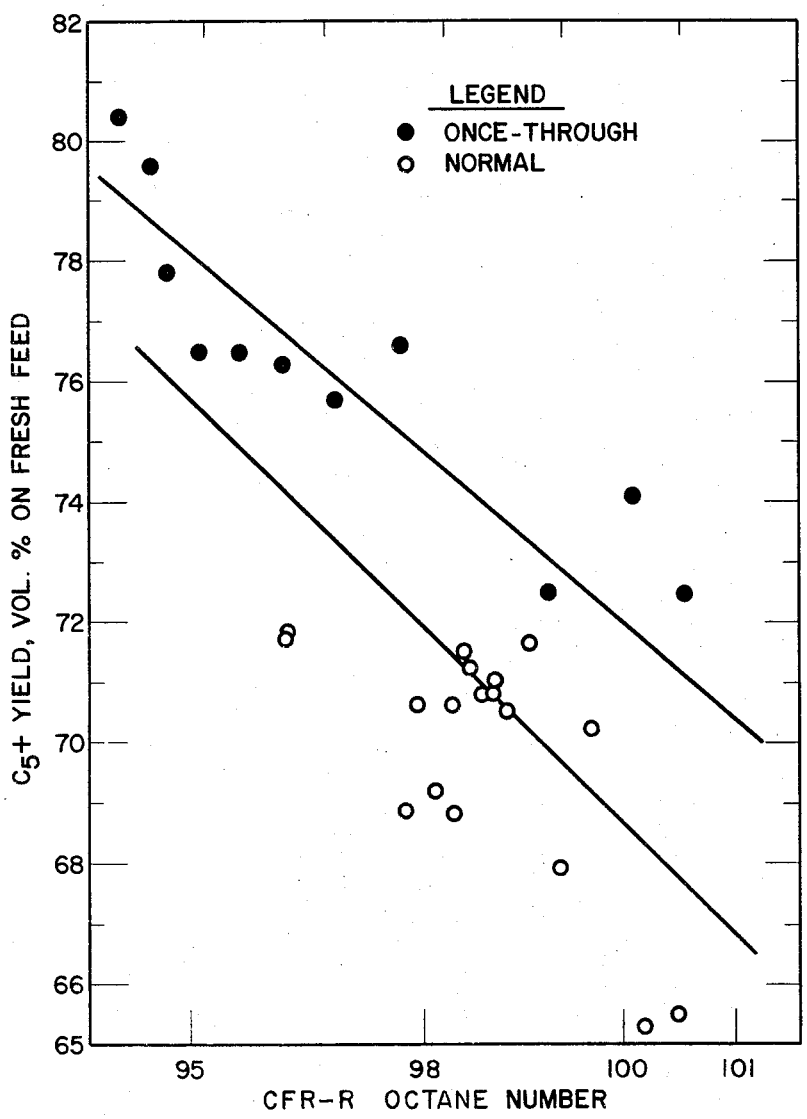
FIGURE I
John Sosnowski
Walter J. Maier
Sumner B. Sweetser
William Priestley, Jr.
Inventors
By H. M. Flagner  Attorney

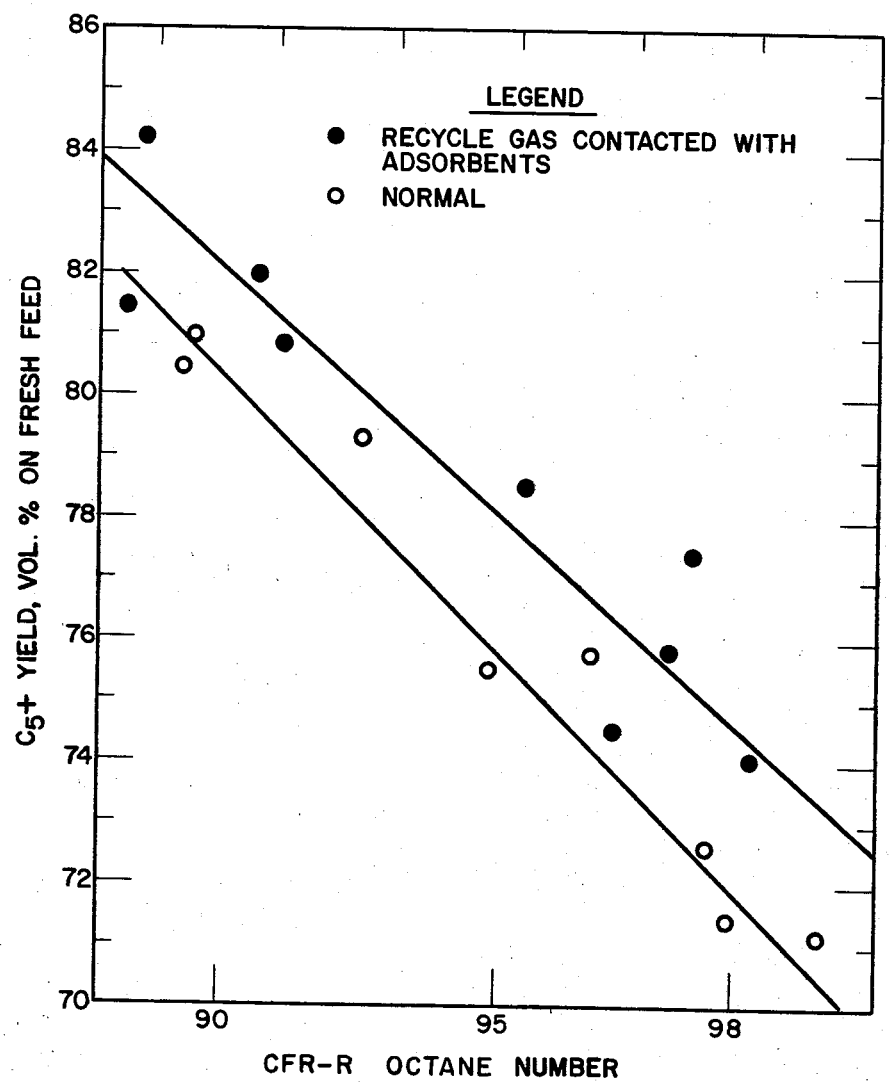
FIGURE II

2,969,319

HCl REMOVED FROM RECYCLE GAS

John Sosnowski, Westfield, Walter J. Maier, Millington, Sumner B. Sweetser, Cranford, and William Priestley, Jr., Rahway, N.J., assignors to Esso Research and Engineering Company, a corporation of Delaware Filed Aug. 1, 1958, Ser. No. 752,511

4 Claims. (Cl. 208—139)

This invention relates to improvements in the platinum or palladium catalyst hydroforming of hydrocarbons. More particularly, it relates to a platinum or palladium catalyst hydroforming process, in which HCl is substantially completely removed from the recycle gas stream. Most particularly, it relates to a fixed bed process in which the catalyst in the reactors after the first reactor contains more halogen than does the catalyst in the first reactors and in which HCl is removed from the recycle gas.

Hydroforming is a process in which the normally liquid feed stock boils substantially within the range of from about 150° to 430° F. and more particularly 180° to 350° F. The light ends, i.e., the material boiling from 0° to 180° F., are not ordinarily subjected to this reaction, for the reason that the virgin naphtha light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recycle gas at temperatures of 750° to 1150° F. in a pressure range of about 50 to 1000 pounds per square inch, and in contact with solid catalysts.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization of paraffins, dealkylation and hydrocracking of paraffins. In a hydroforming operation which is conducted efficiently it is possible with the use of a proper catalyst and proper conditions of operation to hydroform a virgin naphtha to a hydroformate, for example having research clear octane number of from 95 to 98 and obtain yields of $C_5+$ hydrocarbons as high as 80%.

Catalysts used in hydroforming are platinum, palladium, molybdenum oxide, chromium oxide, cobalt molybdate or in general oxides or sulfides of metals of groups IV—VIII of the periodic system of elements or mixtures of these elements supported or dispersed upon a base or spacing element such as alumina gel, precipitated alumina, or zinc aluminate spinel.

A particularly useful catalyst for hydroforming operations is .001–2.0 weight percent platinum upon an alumina spacing agent or base.

In hydroforming operations hydrogen containing recycle and make gas is recycled with the feed in order to minimize coke deposition and to supply heat for the hydroforming reaction. When, as is conventionally done, platinum catalyst is extensively chlorine treated during the reactivation process, chlorine is subsequently stripped off the catalyst in the hydroforming process and is recycled with the recycle gas. Or where chlorides come in with the feed, they build up on the catalyst and are subsequently stripped off the catalyst and build up in the recycle gas. It has now been found according to the present invention that by scrubbing the recycle gas with a basic material or otherwise removing hydrochloric acid from the gas that product yields and octane levels are substantially increased. This finding will apply to other halogen acids. Removal of HCl or halogen acids from the recycle gas may be advantageously accomplished by the use of (1) high surface area adsorbents, (2) chemical materials which are basic in nature and which react with the acidic gas and (3) organic materials such as diethanol amine. It is particularly advantageous to use solid calcium or sodium carbonate or a high surface area material impregnated with basic materials such as sodium hydroxide. Molecular sieves and silica gel may also be successfully used. Scrubbing with water followed by drying of the gas to remove water is also successful.

It has now also been found that removal of water as well as of HCl from the recycle gas is especially advantageous. This may be accomplished by combining a removal of HCl step with a drying step, or by using a material for HCl removal that will also remove water from the recycle gas. This removal of water and HCl simultaneously may be accomplished for example by the use of molecular sieves and caustic under proper conditions, or by the use of a basic material deposited on asbestos. On the other hand, the removal of HCl without the removal of water can be accomplished by the use of diethanolamine or by the use of materials such as finely divided iron that will react with the HCl, or sodium or calcium carbonate. Regardless of the particular materials used in treating the recycle gas, according to the method of this invention HCl levels in the treated gas are reduced below 5 p.p.m. preferably below 1 p.p.m. Likewise if both water and HCl are removed, water level is reduced below 30 p.p.m. preferably below 10 p.p.m. while HCl level is reduced as in the case of HCl removal alone.

It has in addition been found according to the present invention that in fixed bed operations wherein a number of reactors are used in series with intermediate heating between reactors that it is particularly desirable to combine HCl removal from the recycle gas with chlorine treating of the catalyst in the latter reactors in the reactor train more severely than the first reactors in the system. In this way a higher chlorine level is present on the catalyst in these reactors and in the vapors passing through said reactors wherein it is desirable to have most of the hydrocracking and isomerization take place. This is, of course, preferred because it is not desired to hydrocrack the naphthenes which are easily converted under mild hydroforming conditions in the first reactors to valuable aromatics. Also, once the naphthenes have been converted to aromatics, these aromatics which are more stable than the naphthenes can withstand the more severe hydrocracking conditions in the latter reactors. The advantage of the present invention lies in the facts that: (1) additional HCl is picked up from the catalyst in each reactor as the vaporous stream passes through the reactors thus increasing HCl hydrocracking and isomerization in the latter reactors and (2) very high chlorine levels may be maintained on the catalyst itself in the last reactors because all of the HCl picked up by the vapors passing from the last reactors will be removed from the recycle gas before it is passed back to the first reactor where no hydrocracking is desired.

The present invention will be more clearly understood from the following detailed description of the specific examples read in conjunction with the accompanying Figures I and II.

Figure I is a plot of research octane numbers against $C_5+$ yields obtained using (1) once-through operations with no recycle of product recycle gas and (2) normal recycle gas operations.

Figure II is a plot of research octane numbers against $C_5+$ yields obtained (1) where both HCl and water were removed from the recycle gas and (2) where normal operations involving no treating of the recycle gas stream were used.

*Example I*

A 175–350° F. vapor temperature desulfurized virgin naphtha having a CFR research octane number of 53 was hydroformed using first once-through simulated recycle gas and then using ordinary recycle gas. The equipment used was an adiabatic pilot plant consisting of four reactors with means for heating the hydroformate vapors before each stage. This means of heating consisted of tube coils immersed in a constant temperature molten lead bath. Each of the runs was conducted under a pressure of 300 p.s.i.g. with 6000 s.c.f./barrel of recycle gas or simulated recycle gas, and with a recycle gas or simulated recycle gas containing 75% hydrogen and the remainder light hydrocarbons. The simulated recycle gas was a blend of hydrogen and light hydrocarbons to match the composition of normal recycle gas. Temperature of the molten lead bath and thus feed tempeartures to the reactors as well as feed rates were adjusted to give product octanes falling within the range of 95 to 101 octane. The catalyst used was 0.6 wt. percent Pt on an activated eta alumina base. The yield octane data obtained for the once-through simulated recycle gas runs and for the regular recycle gas runs were then plotted as shown in Figure I. An analysis of the separator gas from the once-through operation and from the recycle operation showed 150–200 parts per million water by volume.

It can be seen from Figure I that once-through operations give a 2–4% increase in $C_5+$ yield over the octane range of the figure and that the yield advantage increased at higher octanes.

It is reasonable to assume from this chart and from the fact that the analysis of the separator gas from both the once-through operation and the recycle gas operation showed considerable water being present that a direct improvement in yield may be attributed to the reduced presence of HCl under once-through operations as compared to ordinary recycle gas conditions.

*Example II*

The same naphtha as in Example I was hydroformed using the same equipment and catalyst under the same conditions as in Example I except that 8000 s.c.f./barrel of recycle gas were supplied. Here, normal operations and an operation in which the recycle gas was passed over sodium hydroxide on asbestos followed by anhydrous calcium sulfate were used. HCl levels in the treated gas were reduced below 1 p.p.m. and water level was reduced below 5 p.p.m. Again feed rates were varied so as to obtain different severities of operation. Yield octane data at different severities are shown in Figure II. It can thus be seen that throughout the range of severities reported at least about a 2% increase in yield was obtained where the recycle gas was treated to remove HCl and water and that at higher severities this improvement in yield was even higher than at lower severities.

*Example III*

During the normal 80 hr. oil cycle, the catalyst loses some 0.1–0.2 wt. percent chlorides to the gases passing through the reactor. The gases containing chlorides eventually pass to the separator where $C_5+$ product is condensed. At normal separator conditions (100° F., 50–500 p.s.i.g.) the chlorides distribute between the gas and liquid phase such that most of the chlorides end up in the gas phase.

At typical conditions of 2 w./h./w. space velocity and 6000 s.c.f./b. recycle rate, the average chloride concentration in the recycle gas would be as shown below:

| Chlorine Loss in 80 Hour on Oil Cycle, Wt. Percent on Cat. | Recycle Gas HCl, Content—Mol.—Parts per Million |
|---|---|
| 0.1 | 15 |
| 0.2 | 30 |

The chloride content of the recycle gas is highest in the first few hours after a freshly reactivated and chlorine treated reactor is brought on stream. The chloride content then tapers off until a fresh reactor is brought on stream again.

*Example IV*

A 175 to 350° F. vapor temperature virgin naphtha from central Louisiana mixed crudes is desulfurized to a 0.001% sulfur level and is then passed to a cyclic platinum hydroformer. The catalyst used is 0.3% Pt on an activated eta alumina base. The hydroformer consists of four reactors in series with intermediate heating between the reactors and a swing reactor for regenerating individual reactors from the reactor train. Average on stream time for a particular reactor is 80 hours. Hydroforming is conducted under the following conditions:

| | Reactor 1 | Reactor 2 | Reactor 3 | Reactor 4 |
|---|---|---|---|---|
| Wt. Percent Chlorine Level on Catalyst | 0.3 | 1 | 1 | 1.5 |
| Temperature | 900 | 950 | 950 | 550 |

The recycle gas purification system involves passing the recycle gas from the separator following the last reactor after removal of a separate stream of the excess make gas through a fixed bed of calcium carbonate. The average level of HCl prior to said adsorbing treatment is 20 parts per million by weight of recycle gas and the level after treatment was 0.5 part per million by weight based on recycle gas. Thus according to this system the chloride liberated in the latter reactors is not carried by the recycle gas back to the first reactor where the catalyst is not strongly chlorine treated and where cracking is not desired.

*Example V*

The same equipment and catalyst used in Example IV are used under the same conditions of operation of said example except that the recycle gas is passed over a fixed bed of anhydrous sodium hydroxide impregnated asbestos. Here, levels of HCl and water prior to treatment of the recycle gas are by wt. 20 p.p.m. HCl and 200 p.p.m. of water. After treating, these levels are reduced to about 0.5 p.p.m. HCl and 5 p.p.m. water.

It is to be understood that this invention is not limited to the specific examples, which have been offered merely as illustrations, and that modifications may be made without departing from the spirit of the invention.

What is claimed is:

1. In the hydroforming of hydrocarbons in a reaction zone containing a catalyst comprising an alumina base, halogen and a metal selected from the group consisting of platinum and palladium wherein hydrogen-containing gas is separated from the liquid products for recycle to the reaction zone, the improvement which comprises contacting said hydrogen-containing recycle gas with a solid agent selected from the group consisting of high surface area adsorbents, and high surface area adsorbents impregnated with a solid basic material thereby reducing the halogen acid content of the recycle gas below a level of 5 p.p.m. and simultaneously reducing the water content of said recycle gas to below a level of 30 p.p.m. and returning the gas thus treated to said reaction zone.

2. The process of claim 1 wherein said halogen acid is hydrogen chloride and the concentration thereof in said recycle gas is reduced to below 1 p.p.m.

3. The process of claim 1 wherein said reaction zone comprises a number of reactors, in series, with intermediate heating of the reaction vapors between reactors and wherein said catalyst in the last of said reactors treating said reaction vapors contains a larger amount of halogen than the catalyst in the first of said reactors.

4. The process of claim 3 wherein said halogen is chlorine, wherein said halogen acid is hydrogen chloride, wherein the concentration of said hydrogen chloride in said recycle gas is reduced to below 1 p.p.m., and wherein there is at least a 2 volume percent increase in yield of said liquid product over that obtained in the absence of said treatment of the recycle gas.

References Cited in the file of this patent

UNITED STATES PATENTS

| | | |
|---|---|---|
| 2,395,022 | Sutton et al. | Feb. 19, 1946 |
| 2,759,876 | Teter et al. | Aug. 21, 1956 |